United States Patent
D'Aversa et al.

(10) Patent No.: US 10,199,864 B2
(45) Date of Patent: Feb. 5, 2019

(54) MULTILINGUAL POWER SYSTEM PROTECTION DEVICE

(71) Applicant: Schweitzer Engineering Laboratories, Inc., Pullman, WA (US)

(72) Inventors: Angelo D'Aversa, Ambler, PA (US); Man Lung Lee, Wayne, PA (US); Matthew J. Howell, Vancouver, WA (US); Thomas Allen Stanley, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 23 days.

(21) Appl. No.: 15/000,858

(22) Filed: Jan. 19, 2016

(65) Prior Publication Data

US 2016/0210967 A1    Jul. 21, 2016

Related U.S. Application Data

(60) Provisional application No. 62/105,421, filed on Jan. 20, 2015.

(51) Int. Cl.
*H02J 13/00* (2006.01)
*G10L 15/22* (2006.01)

(52) U.S. Cl.
CPC ............ *H02J 13/001* (2013.01); *G10L 15/22* (2013.01); *Y02E 60/724* (2013.01); *Y04S 10/18* (2013.01); *Y04S 10/40* (2013.01)

(58) Field of Classification Search
None
See application file for complete search history.

(56) References Cited

U.S. PATENT DOCUMENTS

| | | | | |
|---|---|---|---|---|
| 7,769,495 | B1* | 8/2010 | Rodkey | G05B 15/02 700/286 |
| 2002/0082844 | A1* | 6/2002 | Van Gestel | G06F 3/16 704/275 |
| 2002/0103642 | A1* | 8/2002 | Asada | G06F 9/454 704/231 |

(Continued)

OTHER PUBLICATIONS

Schneider Electric, TeSys® T Motor Management System Catalog 2008, 2008.

(Continued)

*Primary Examiner* — Pierre Louis Desir
*Assistant Examiner* — Jonathan C Kim
(74) *Attorney, Agent, or Firm* — Jared L. Cherry; Richard M. Edge

(57) ABSTRACT

A multilingual power system protection device to facilitate communications in different human languages over different communication ports is described herein. In one embodiment, an electric power system device may include communication ports configured to receive inputs in different human languages and a monitored equipment interface in communication with a component of an electric power system. The electric power system device may receive an input on one of the communication ports and may associate the input with a function implemented by the component of the electric power system. The electric power system device may further generate a response in a pre-selected human language, and may transmit the response using the communication ports.

20 Claims, 4 Drawing Sheets

(56) References Cited

U.S. PATENT DOCUMENTS

| | | | |
|---|---|---|---|
| 2003/0182632 A1* | 9/2003 | Murdock | G06F 9/454 |
| | | | 715/273 |
| 2005/0171784 A1 | 8/2005 | Fukushima | |
| 2006/0009157 A1* | 1/2006 | Chiu | H04W 16/22 |
| | | | 455/67.11 |
| 2006/0077411 A1* | 4/2006 | Mathieson | G06F 17/289 |
| | | | 358/1.13 |
| 2008/0114598 A1* | 5/2008 | Prieto | G10L 15/005 |
| | | | 704/254 |
| 2008/0127210 A1* | 5/2008 | Bosold | H04L 67/025 |
| | | | 719/313 |
| 2009/0254524 A1 | 10/2009 | Francker | |
| 2013/0007608 A1 | 1/2013 | Li | |

OTHER PUBLICATIONS

PCT/US2016/014059 Patent Cooperation Treaty, International Search Report and Written Opinion of the International Searching Authority, dated Mar. 24, 2016.

* cited by examiner

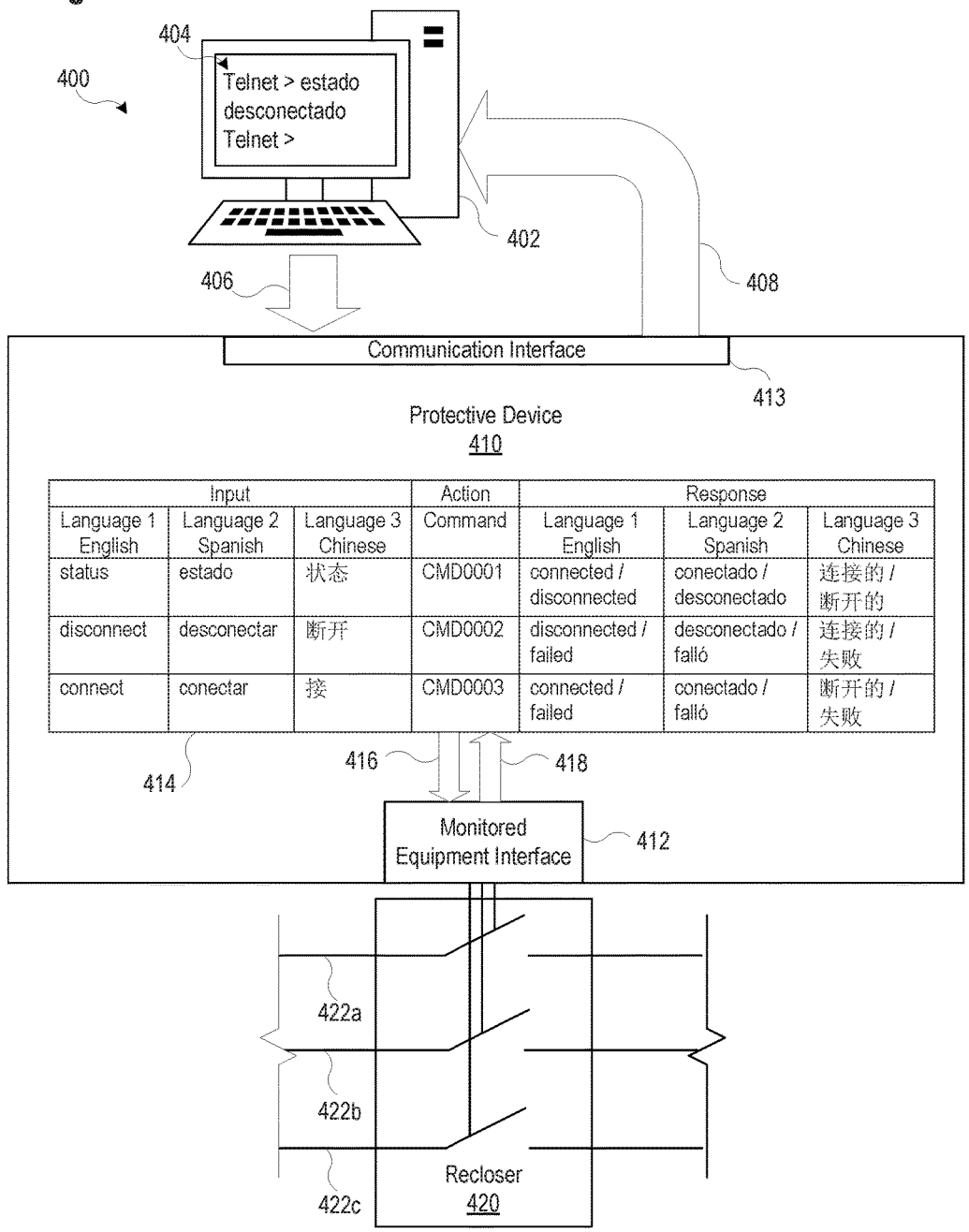

MULTILINGUAL POWER SYSTEM PROTECTION DEVICE

RELATED APPLICATION

The present application claims priority under 35 U.S.C. § 119(e) to U.S. Provisional Patent Application No. 62/105,421, filed Jan. 20, 2015, and titled "Multilingual Power System Protection Device," which is incorporated herein by reference in its entirety.

TECHNICAL FIELD

This disclosure relates to a multilingual power system protection device. More particularly, this disclosure relates to an electric power system device with a first communication port facilitating communication in a first human language and a second communication port facilitating communication in a second human language. This disclosure also relates to a programmable logic controller with a first communication port facilitating communication in a first human language and a second communication port facilitating communication in a second human language.

BRIEF DESCRIPTION OF THE DRAWINGS

Non-limiting and non-exhaustive embodiments of the disclosure are described, including various embodiments of the disclosure with reference to the figures, in which:

FIG. 4 illustrates a conceptual representation of a system for facilitating communications with an electric power system protective device in a plurality of human languages consistent with embodiments of the present disclosure.

DETAILED DESCRIPTION

Figure 1:
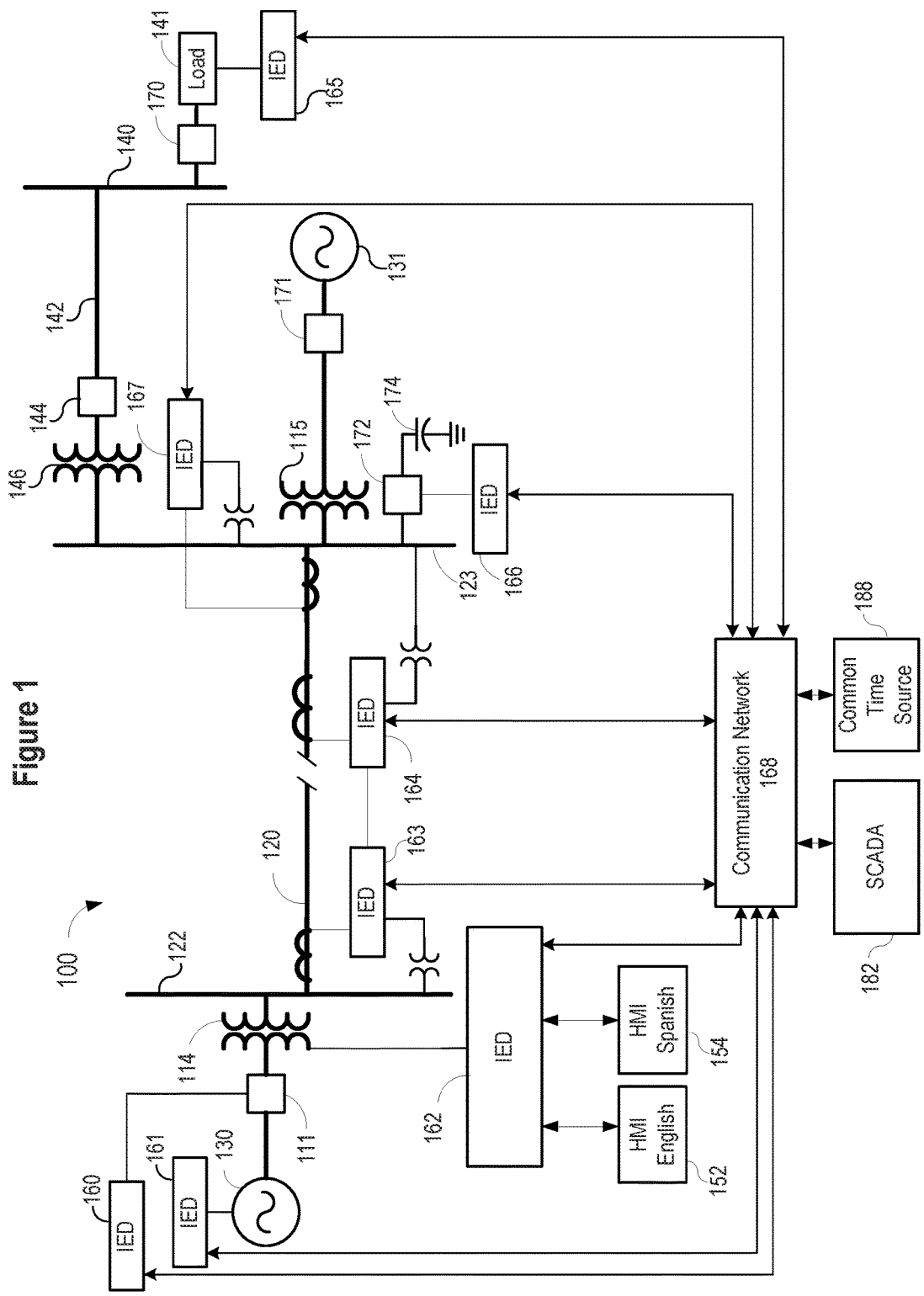
FIG. 1 illustrates a simplified one-line diagram of an electric power delivery system including a multilingual power system protection device consistent with embodiments of the present disclosure.

Electric power delivery systems (including electric power generation, transmission, distribution and other such systems) provide a critical infrastructure for society. As an effective system for transporting energy, an electric power delivery system may span long distances, even traversing physically difficult regions, political borders, and the like. Multitudes of people may depend on the same, or part of the same, electric power delivery system to provide electric power to homes, hospitals, manufacturing centers, businesses, and the like.

Intelligent electronic devices ("IEDs") are often used to monitor, protect, control, and meter electric power delivery systems, or the various elements that make up such systems. IEDs may include, for example, protective relays in electrical communication with the electric power delivery system or components thereof to obtain electrical signals therefrom and monitor, protect, control, and/or meter the electric power delivery system or component thereof. For example, an IED such as a distance relay may be used to monitor the voltages and/or currents on an electric power transmission line, detect a fault, and determine a distance to the fault using the voltages and/or currents. In another example a transformer differential relay may be used to monitor current values on both sides of an electric power transformer, and determine whether a fault has occurred within the transformer. Upon detection of a fault, IEDs may be configured to take a protective action such as signaling a circuit breaker to open, to isolate the fault from the remainder of the electric power delivery system.

Due to the ubiquity of electric power delivery systems in many countries, IEDs may be used in different regions and by users who speak different languages. Furthermore, because electric power delivery systems may span different political borders or regions where different languages are spoken, there may be a need for a particular IED to display and receive communications in different human languages. Further still, individuals within a single organization may speak different languages or be familiar with functions of the IED in different human languages. For example, a relay technician may be familiar with setting the IED in the English language, whereas an information security technician may be familiar with security information in another language such as Spanish. The inventors of the present application have recognized that the foregoing issues, together with other advantages may be realized by an IED capable of facilitating communication in multiple human languages.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described will be illustrated as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of media/machine-readable medium suitable for storing electronic instructions.

FIG. 1 illustrates a simplified diagram of an example of an electric power delivery system 100 consistent with embodiments disclosed herein. The systems and methods described herein may be applied and/or implemented in the system electric power delivery system 100 illustrated in FIG. 1. Although illustrated as a one-line diagram for purposes of simplicity, an electrical power delivery system 100 may also be configured as a three-phase power system. The electric power delivery system 100 may include, among other things, electric generators 130 and 131, configured to generate an electrical power output, which in some embodiments may be a sinusoidal waveform.

Generators 130 and 131 may be selectively connected to the electric power delivery system using switches or circuit breakers 111 and 171, respectively. Step-up transformers 114 and 115 may be configured to increase the output of the electric generators 130 and 131 to higher voltage sinusoidal waveforms. Buses 122 and 123 may distribute the higher voltage sinusoidal waveform to a transmission line 120 between buses 122 and 123. Step-down transformer 146 may decrease the voltage of the sinusoidal waveform from bus 123 to a lower voltage suitable for electric power distribution on line 142. Distribution line 142 is further selectively connectable to bus 123 via circuit breaker or switch 144, and may distribute electric power to a distribution bus 140. Load 141 (such as a factory, residential load, motor, or the like) may be selectively connected to distribution bus 140 using switch or circuit breaker 170. It should be noted that additional transformers or other equipment may be used to further step down a voltage from the distribution bus 140 to the load 141.

Various other equipment may be included in the electric power delivery system. Also illustrated is switched capacitor bank ("SCB") 174 selectively connectable to transmission bus 123 using circuit breaker or switch 172. Other equipment that may be included in the electric power delivery system may include, for example, static VAR compensators, reactors, load tap changers, voltage regulators, autotransformers, and the like. Some of these are considered as included in the electric power system 100 such as, for example, load tap changers can be considered as part of the load 141. Generators 130 and 131, may be any generator capable of providing electric power to the electric power delivery system, and may include, for example, synchronous generators, turbines (such as hydroelectric turbines, wind turbines, gas-fired, coal-fired, and the like), photovoltaic electric generators, tidal generators, wave power generators, and the like. Such generation machines may include components such as power-electronically coupled interfaces for example doubly-fed induction machines, direct coupled AC-DC/DC-AC transfer devices, and the like. It should be noted that these are not exhaustive lists, and other equipment, machines, and connected devices may be considered under this disclosure.

As mentioned above, modern electric power delivery systems (which may include electric power generation systems, transmission systems, distribution systems, and consumption systems) are controlled using IEDs. FIG. 1 illustrates several IEDs 160-167 that may be configured to monitor and/or to control the one or more elements of the electric power delivery system. An IED may be any processor-based device that monitors and/or controls monitored equipment within an electric power delivery system (e.g., system 100). In some embodiments, the IEDs 160-167 may gather equipment status from one or more pieces of monitored equipment (e.g., generator 130). Equipment status may relate to the status of the monitored equipment, and may include, for example, breaker or switch open or closed, valve position, tap position, equipment failure, rotor angle, rotor current, input power, automatic voltage regulator state, motor slip, reactive power control set point, generator exciter settings, and the like. Further, the IEDs 160-167 may receive measurements concerning monitored machines or equipment using sensors, transducers, actuators, and the like. Measurements may relate to a measured status of the machine or equipment, and may include, for example, voltage, current, temperature, pressure, density, infrared absorption, viscosity, speed, rotational velocity, mass, and the like. With the equipment status and/or measurements, IEDs may be configured to derive or calculate derived values. Such derived values may be any values derived or calculated from the measurements and/or equipment status and may include, for example, power (real and reactive), magnitudes and angles of voltages and currents, frequency, rate of change of frequency, phasors, synchrophasors, fault distances, differentials, impedances, reactances, symmetrical components, alpha components, Clarke components, alarms, and the like.

According to certain embodiments, IEDs 160-167 may issue control instructions to the monitored equipment in order to control various aspects relating to the monitored equipment. Some examples of actions include: opening a breaker which disconnects a generator with a rotor angle moving towards instability; opening a breaker which sheds load that is causing a voltage to decline towards a collapsing condition; opening a breaker to remove an asset when the asset, such as a line or transformer, is exceeding its safe operating limits; opening a breaker which sheds load that is causing the frequency of the system to decline such that it is exceeding predefined operating limits; inserting shunt capacitance with the effect of increasing the voltage on an electric power line so that the reactive requirements on a generator are not exceeded and therefore preemptively preventing the generator from being removed from service by a reactive power control; activating a dynamic brake which counters the acceleration of a machine rotor; adjusting a set-point on a governor to limit the power output of a synchronous machine so that it does not exceed the safe operating limits; simultaneously adjusting set-points of other synchronous machines so that they pick-up the new load; adjusting a voltage regulation set-point of an automatic voltage regulator such that a voltage at a more distant point in the power system does not exceed its maximum or minimum voltage threshold; and the like.

An IED (e.g., IED 160) may be in communication with a circuit breaker (e.g., breaker 111), and may be capable of sending an instruction to open and/or close the circuit breaker, thus connecting or disconnecting a portion of a power system. In another example, an IED may be in communication with a recloser and capable of controlling reclosing operations. In another example, an IED may be in communication with a voltage regulator and capable of instructing the voltage regulator to tap up and/or down. Information of the types listed above, or more generally, information or instructions directing an IED or other device or equipment to perform a certain action, may be generally referred to as control instructions.

IEDs 160-167 may be communicatively linked together using a data communications network 168, and may further be communicatively linked to a central monitoring system, such as a supervisory control and data acquisition (SCADA) system 182.

The illustrated embodiments are connected with communication network 168 at its center, however, other topologies are also contemplated. For example, the IEDs 160-167 may be communicatively coupled directly to the SCADA system 182. Certain IEDs, such as IEDs 163 and 164, may be in direct communication with each other to effect, for example, line differential protection of transmission line 120. The data communications network of the system 100 may utilize a variety of network technologies, and may comprise network devices such as modems, routers, firewalls, virtual private network servers, and the like. Further, in some embodiments, the IEDs 160-167 and other network devices (e.g., one or more communication switches or the like) may be communicatively coupled to the communications network 168 through a network communications interface.

Consistent with embodiments disclosed herein, IEDs 160-167 may be communicatively coupled with various points to the electric power delivery system 100. For example, IEDs 163 and 164 may monitor conditions on transmission line 120. IED 160 may be configured to issue control instructions to associated breaker 111. IEDs 163, and 167 may monitor conditions on buses 122, and 123. IED 161 may monitor and issue control instructions to the electric generator 130. IED 162 may monitor and issue control instructions to transformer 114. IED 166 may control operation of breaker 172 to connect or disconnect SCB 174. IED 165 may be in communication with load center 141, and may be configured to meter electric power to the load center. IED 165 may be configured as a voltage regulator control for regulating voltage to the load center using a voltage regulator (not separately illustrated).

In certain embodiments, communication between and/or the operation of various IEDs 160-167 and/or higher level systems (e.g., SCADA system 182) may be facilitated by communication network 168. The communication network 168 may also include further IEDs such as an automation controller, central IED, communication processor, access controller, and may include an Ethernet network, fiber optic network, an intranet, the Internet, and the like.

The IEDs 160-167 may communicate a variety of types of information to and through the communication network 168 including, but not limited to, operational conditions, status and control information about the individual IEDs 160-167, event (e.g., a fault) reports, communications network information, network security events, and the like. In some embodiments, the communication network 168 may be directly connected to one or more pieces of monitored equipment (e.g., electric generator 130 or breakers 111, or 172).

The communication network 168 may also be communicatively coupled to a common time source (e.g., a clock) 188. In certain embodiments, the communication network 168 may receive a time signal based on the common time source 188 that may be distributed to communicatively coupled IEDs 160-167. Alternatively, IEDs may be individually connected to a common time source. Based on the time signal, various IEDs 160-167 may be configured to collect and/or calculate time-aligned operational conditions including, for example, synchrophasors, and to implement control instructions in a time coordinated manner. IEDs may use the time information to apply a time stamp to operational conditions and/or communications. In other embodiments, the communication network 168 may not receive a time signal, but a common time signal may be distributed to IEDs 160-167.

The common time source 188 may also be used by the IEDs 160-167 for time stamping information and data. Time synchronization may be helpful for data organization, real-time decision-making, as well as post-event analysis. Time synchronization may further be applied to network communications. The common time source 188 may be any time source that is an acceptable form of time synchronization, including, but not limited to, a voltage controlled temperature compensated crystal oscillator, Rubidium and Cesium oscillators with or without a digital phase locked loops, microelectromechanical systems (MEMS) technology, which transfers the resonant circuits from the electronic to the mechanical domains, or a Global Navigational Satellite System (GNSS) such as a Global Positioning System (GPS) receiver with time decoding. In the absence of a discrete common time source 188, the communication network 168 may serve as the common time source 188 by distributing a time synchronization signal. Alternatively, each IED 160-167 can keep a local time based on a local time-keeping mechanism.

As is detailed above, the electric power delivery system 100 illustrated in FIG. 1 includes local control and protection using IEDs 160-167, and wide-area control using the communication network 168 and/or SCADA 182.

By way of example, IED 162 is illustrated as a multilingual electric power system device. IED 162 is illustrated as a transformer protective relay, but any IED could be configured as described herein as a multilingual electric power system device. User-IED interactions may take place using several interfaces. IEDs may include a local human-machine interface ("HMI") such as a display on a front panel of the IED. An IED with a local HMI may be configured to allow for certain user communication using the HMI. For example, the local HMI may display certain operational parameters of the IED such as, for example, a rotating display of the latest fault detected, whether a trip has occurred, whether an alarm has occurred, and the like. The IED may be configured to display other information using the local HMI. The IED may include an interface to receive user inputs, the interface including, for example, a touch-screen, buttons, or the like. The IED may be configured such that a user may enter information and/or commands using the interface. The IED may be configured to require a password, or levels of passwords for a user to use the local HMI to enter commands, enter information, and/or modify settings of the IED. The IED may be configured such that the local HMI operate in a specific human language such as, for example, English, Spanish, Portuguese, Russian, or the like.

Figure 3:
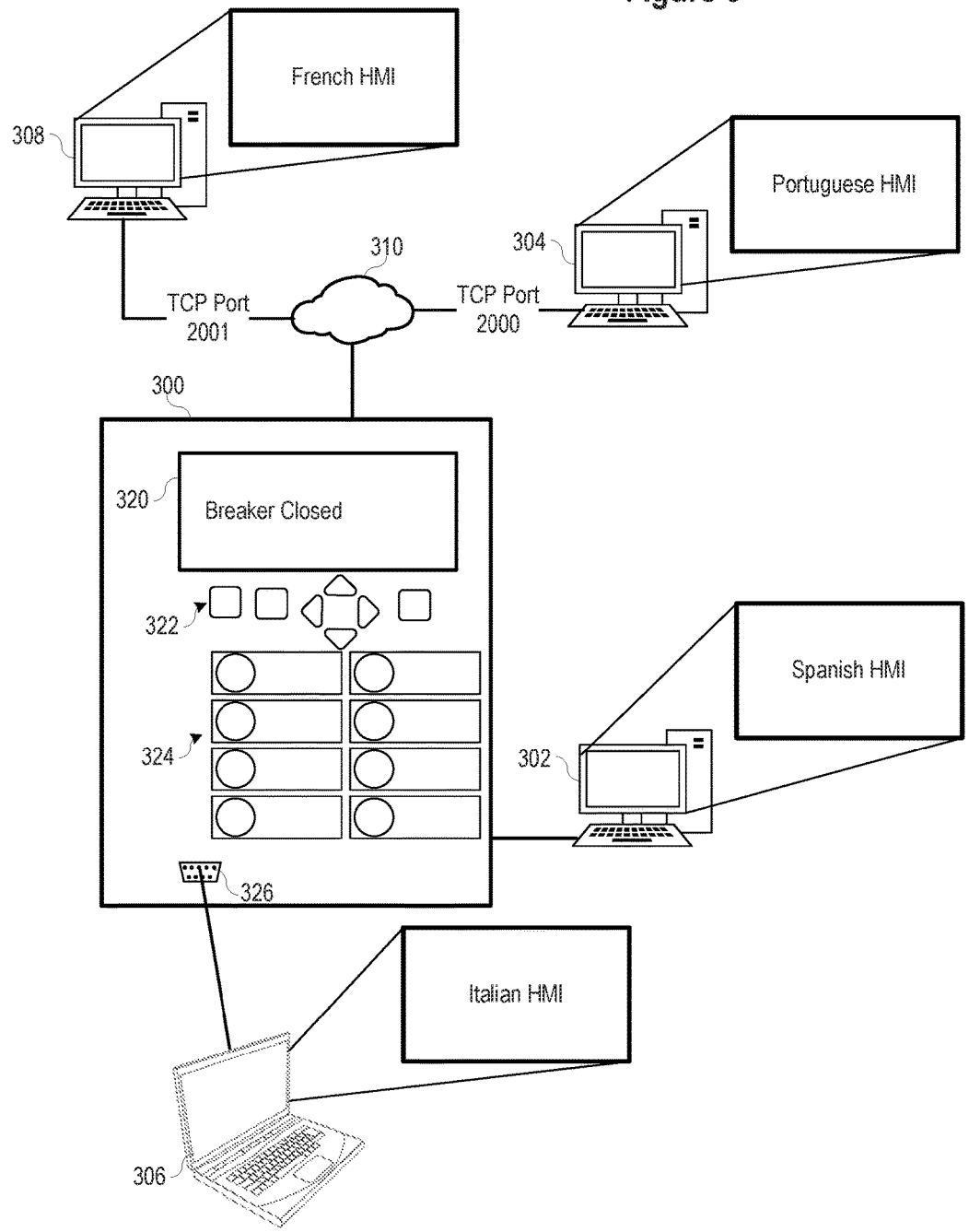
FIG. 3 illustrates multilingual power system protection device facilitating communication in multiple human languages using a plurality of devices consistent with embodiments of the present disclosure.

In addition to the local HMI, an IED may be configured with various communication ports to facilitate human communication. For example, IED may include a front panel communications port such as a serial port for electrical communication with a device such as a laptop computer configured to connect with the front panel of the IED for communications therewith. Furthermore, the IED may include multiple communication ports on the rear panel or an access panel to the IED to facilitate communications with a number of devices, such as workstations. The workstations may be located within the same enclosure as the IED (such as a control station), or accessible via a communications network. FIG. 3, discussed below, further illustrates various communications ports to facilitate human communications.

As illustrated in FIG. 1, IED 162 is in communication with a first human-machine interface ("HMI") 152, which is illustrated as an English HMI, and with a second HMI 154, which is illustrated as a Spanish HMI. The IED 162 may be configured to use English HMI 152 to display information in the English language; and use the Spanish HMI 154 to display information in the Spanish language. HMIs 152 and 154 are illustrated for the purpose of example, and described herein as displaying information in the English and Spanish languages, respectively, however any language is contemplated. IED 162 may be further configured to receive user communications from HMI 152 in the English language, and from HMI 154 in the Spanish language. Thus, IED 162 may be a multilingual power system protection device. In one embodiment, IED 162 may be configured to simultaneously communicate with the English HMI 152 in English and with the Spanish HMI 154 in Spanish. In another embodiment, IED 162 may communicate with the English HMI 152 in English and the Spanish HMI 154 in Spanish without reconfiguration of the IED 162 as to the language.

Communication with an IED may further take place using a communications port of the IED. For example, an IED may include a communications port such as a serial port configured for communication with a communications network or a device attached thereto. In one embodiment, an IED may include a variety of types of ports configured for communication. Such communication ports may include, but are not limited to serial ports, parallel ports, Universal Serial Bus (USB) ports, IEEE 1394 ports, network communication ports, and the like. The communication ports may facilitate communication with a variety of types of devices. Such devices may include computing devices (e.g., desktop computers, servers, laptop computers, smartphones, tablet computers, or the like) and/or other devices in system 100 (e.g., IEDs 160-167, SCADA system 182, monitored equipment, etc). Communication among various devices may be facilitated using direct cables connections between communicating devices and the IED or over a communications link or network that may include routers, switches, hubs, multiplexors, and the like. In some embodiments, an electric power system protection device consistent with the present disclosure may be configured to communicate using a particular communication port, such that communications are displayed on the device connected to the IED using a specified human language. Further, an electric power system protection device consistent with the present disclosure may be configured to receive communications using the same particular human language from the device connected to the IED on a particular port.

The IED may include a second communication port such as a serial port configured for communication with a communications network or a device attached thereto. The IED may be configured such that the second communication port facilitates communication with a device in a manner similar to the configuration of the IED with respect to the first communication port. However, the IED may be configured to facilitate communications over the second communications port in a second predetermined language such that a device in communication with the IED using the second communications port displays communications in a second predetermined human language, and the IED is configured to receive communications using the second predetermined human language from the device in communication with the IED using the second communications port. To facilitate communications with the IED in multiple languages, the IED may be configured to simultaneously facilitate communications on a first port in a first human language and a second port in a second human language. Thus a device in communication with the IED using the first communications port would display and receive communications from a user in a first human language while a device in communication with the IED using the second communications port would display and receive communications from a user in a second human language. Further, IED may be configured to display and receive communications with a user on the local HMI in the first human language, the second human language, or a third human language.

In one embodiment, an electric power system protective device consistent with the present disclosure may be configured to communicate with devices connected thereto via a communications port using a text-based command interface. A variety of text-based command interfaces may be utilized in various embodiments, including a Unix shell, a telnet client, and the like. In various embodiments, a text-based command interface may communicate using text-based encoding schemes, such as the ASCII scheme. In various embodiments, devices in communication with the IED may receive communications using the ASCII scheme, and transmit communications to the IED using the ASCII scheme. In other embodiments, extended character sets supporting various languages may be used. Embodiments utilizing a text-based command interface may allow communication between an IED and a user-terminal without use of unique or proprietary software. Rather, a variety of operating systems, programs, and technologies may be used to interface with an electric power system protective device consistent with the present disclosure.

In various embodiments, distinct physical communication ports may be used for different languages (e.g., serial port 1 may be used for language 1 and serial port 2 may be used for language 2). In one embodiment, a device may be configured such that one communications port transmits information to a device in a first human language such as English, and to receive communications from the user in the first human language. The device may be further configured such that another communications port transmits information to another device using the ASCII scheme to communicate with a user in a second human language such as Spanish, and to receive communications from the user in the second human language. The device may be configured to communicate with users using the first and second human languages simultaneously, such that no further configuration or settings of the IED may be required to switch between one human language and another human language. Thus, the IED may facilitate communications in multiple languages.

In other embodiments, a single physical communication port may be used for different languages and the languages may be differentiated using other techniques (e.g., a single Ethernet communication port may receive language 1 on TCP port 1 and may receive language 2 on TCP port 2).

References in the present disclosure to the use of multiple ports may refer both to distinct physical ports and to other techniques that may be used to differentiate communications received through a single physical interface.

Figure 2:
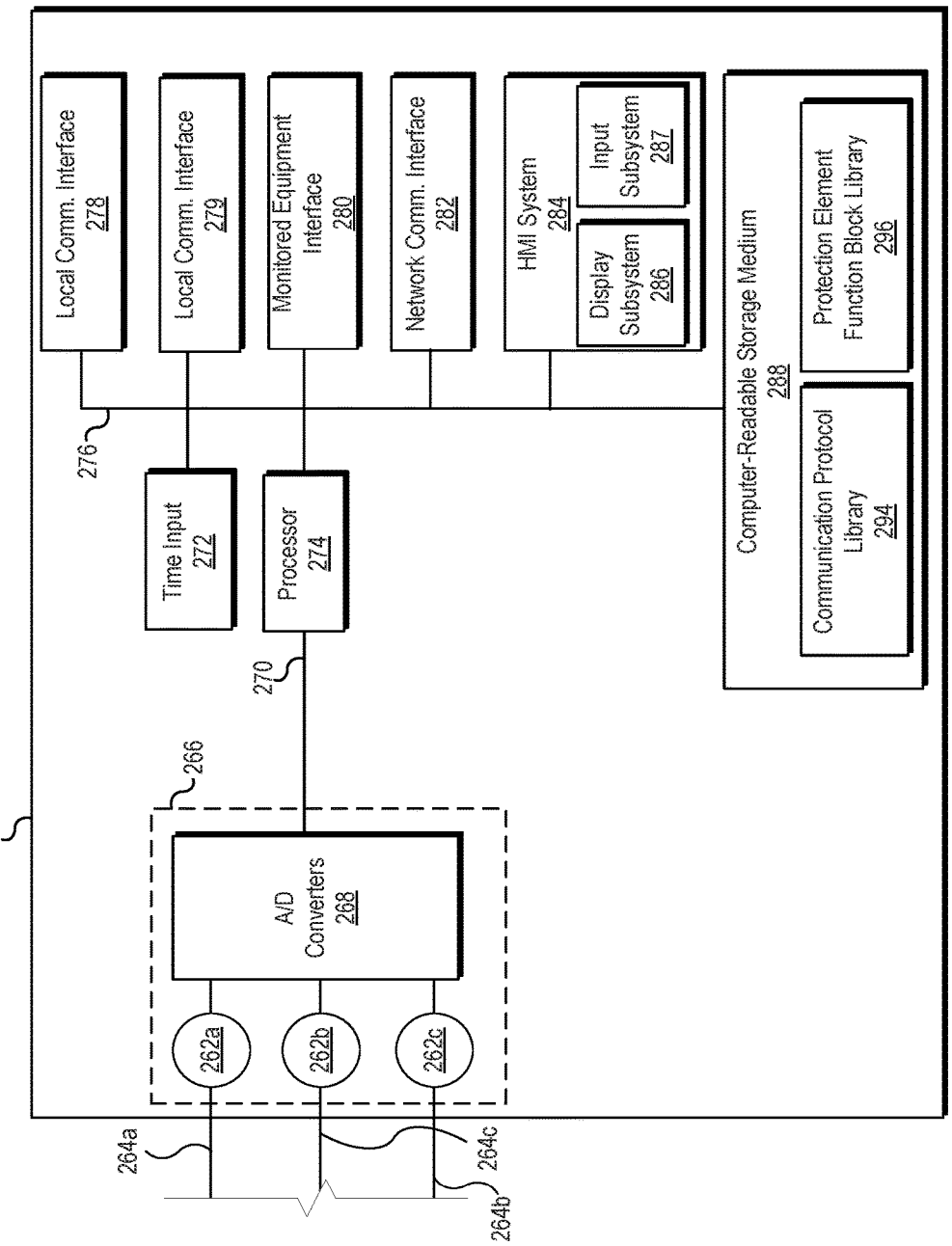
FIG. 2 illustrates a functional block diagram of multilingual power system protection device consistent with embodiments of the present disclosure.

FIG. 2 illustrates a functional block diagram of an IED 260 configured to communicate in multiple human languages, such as IED 162 of FIG. 1. Although FIG. 2 illustrates an embodiment that includes hardware and software, various embodiments of the present disclosure may be implemented in an embedded system, field programmable gate array implementations, and specifically designed integrated circuit. Software functions described in connection with various software modules may be implemented in various types of hardware. Moreover, certain components or functions described herein may be associated with other devices or performed by other devices. The specifically illustrated configuration is merely representative of one embodiment consistent with the present disclosure.

IED 260 includes a network communications interface 282 configured to communicate with other IEDs and/or system devices such as communications network 168. The network communications interface 282 may facilitate communications with multiple IEDs. IED 260 may further include a time input 272, which may be used to receive a time signal allowing IED 260 to apply a time-stamp to the acquired measurements, event reports, or other data. In certain embodiments, a common time reference may be received via communications interface 282, and accordingly, a separate time input may not be required for time-stamping and/or synchronization operations. One such embodiment may employ the IEEE 1588 protocol. A monitored equipment interface 280 may be configured to receive status information from, and issue control instructions to, a piece of monitored equipment.

Local communication interfaces 278 and 279 may also be provided for local communication with IED 260. The local communication interfaces 278 and 279 may be embodied in a variety of ways, including as a serial port, a parallel port, a Universal Serial Bus (USB) port, an IEEE 1394 Port, and the like. Local communications interfaces 278 and 279 may be the communications ports referenced in the above embodiments, wherein each may be configured to facilitate a different human language interaction with the IED 260.

In certain embodiments, IED 260 may include a sensor component 266. In the illustrated embodiment, sensor component 266 is configured to gather data directly from a plurality of conductors 264a-c and may use, for example, A/D converters 268 that may sample and/or digitize filtered waveforms to form corresponding digitized current and voltage signals provided to data bus 270. Conductors 264a-c may be electrically connected to an electric power distribution system. In some embodiments transformers (not shown) may reduce the voltage or current to a level appropriate for monitoring using the IED 260. A/D converters 268 may include a single A/D converter or separate A/D converters for each incoming signal. A current signal may include separate current signals from each phase of a three-phase electric power system. A/D converters 268 may be connected to processor 274 by way of data bus 270, through which representations of electrical parameters determined by sensor elements 262a-c may be transmitted to processor 274. In various embodiments, the representations of electrical parameters may represent parameters, such as currents, voltages, frequencies, phases, and other parameters associated with an electric power distribution system. Sensor elements 262a-c may represent a variety of types of elements, such as voltage transformers, current transformers, status inputs, a breaker controller, etc.

In some embodiments, the operation of one or more of sensor elements 262a-c may be selectively enabled based on the configuration of IED 260. Further, a user may be able to enable additional sensor elements after a device is installed using the techniques described herein for upgrading devices. In some embodiments, sensor elements that are selectively enabled or disabled may comprise virtual elements running on processor 274.

Processor 274 may be configured to process communications received via communications interface 282, local communications interfaces 278 and 279, time input 272, monitored equipment interface 280, and/or sensor component 266. Processor 274 may operate using any number of processing rates and architectures. Processor 274 may be configured to perform various algorithms and calculations described herein. Processor 274 may be embodied as a general purpose integrated circuit, an application specific integrated circuit, a field-programmable gate array, and/or any other suitable programmable logic device.

A Human-Machine Interface (HMI) system 284 may be configured to facilitate interaction between a user and IED 260. In some embodiments, HMI system 284 may comprise a display subsystem 286 and an input subsystem 287. In various embodiments, the display subsystem 286 may include one or more displays configured to present information to a user. In some embodiments, display subsystem 286 may be configured to display a status indicator associated with monitored equipment in communication with IED 260. The status indicator may be displayed in a first human language on a first display and in a second human language on a second display. The input subsystem 287 may include one or more of a keyboard, mouse, touch-screen, speaker, and the like. The input subsystem 287 may be configured to receive input (e.g., commands, inquiries, etc.) from a user. In some embodiments, one or more elements of HMI may be selectively enabled by a configuration of IED 260. For example, visualization features may be enabled or disabled based on a configuration setting specified by a filter. As described above, the HMI system 284 may be configured to facilitate communications with a user in a predetermined human language that may be the same as or different from the human languages facilitated using local communication interfaces 278 and 279.

A computer-readable storage medium 288 may be the repository of various software modules configured to perform any of the methods described herein. A data bus 276 may link monitored equipment interface 280, time input 272, communications interface 282, HMI system 284, and computer-readable storage medium 288 to processor 274. Various modules and/or sub-modules may be selectively enabled based on the configuration of IED 260. A communication protocol library 294 may be configured to allow IED 260 to communicate with any of a variety of external devices using a variety of data communication protocols (e.g., DNP, IEC 61850, MODBUS, IEC 60870, MB, etc.). The communication protocol library may be used to facilitate the multilingual communication over local communication interfaces 278 and 279. In one embodiment, the communication protocol library 294 may include an array of functions stored in arrays, where the arrays are indexed by human language. Thus, based on the local communications interface 278, 279 being used, the appropriate function may be retrieved based on the human language configured for the particular local communications interface 278, 279. For example, the IED may include a function to view the current date stored in an array, indexed by the string "DAT" for communications using the English language and as "FEC" for communications using the Spanish language. In an embodiment where the IED is configured to use the human language English for communications on local communication interface 278 and the human language Spanish for communications on local communication interface 279, a user entering the command "DAT" on the local communication interface 278 would cause the IED 260 to display the date over local communication interface 278, whereas a user entering the command "FEC" on the local communication interface 279 would cause the IED 260 to display the date over local communication interface 279. The described indexing using English and Spanish languages is merely an example to illustrate the function of this embodiment. It should be appreciated that the IED may be configured with any number of languages, where functions may be indexed according to any number of languages.

Furthermore, the IED may be configured at setting time to assign a particular human language to the local communication interface 278, a different or the same language to local communication interface 279, and a different or one of the previous languages to HMI System 284. Communications over these various communications media may be accomplished using the indexing described above. It should also be understood that the IED 260 may be provided with additional local communication interfaces, and configured to facilitate communications in different human languages on each local communications interface.

A protection element function block library 296 may provide various features that may be implemented by IED 260. For example, the protection element function block library 296 may implement, for example, an overcurrent function, an overload function, an over-frequency function, a differential function, and the like. One or more protection element functions may be selectively enabled based on one or more configuration settings. For example, where IED 260 is configured to monitor for an overcurrent condition, the overcurrent function may be enabled from the various functions provided by the protection element function block library 296. Moreover, the protection element function blocks may be enabled and combined in various combinations to achieve a desired feature set.

FIG. 3 illustrates an IED 300 configured to facilitate communications in a number of different human languages according to various embodiments described herein. IED 300 includes a local HMI display 320 for displaying information from the IED to a user in a first human language, while other ports are configured to communicate using a second human language. The IED 300 may be pre-configured at the factory to communicate in a first human language on the local HMI display 320, and configurable by a user to communicate in another human language. For pre-configuration of the local HMI display 320 at the factory to a specific human language, an end user may have specified the particular human language for pre-configuration using, for example, a model option table at ordering time. As illustrated, local HMI display 320 may be configured to communicate in the English language. Although not specifically illustrated, local HMI display 320 may receive information to display from a communications port internal to IED 300. Such a port may be embodied in a variety of ways, including various standard interfaces (e.g., a serial port, a VGA port, a DVI port, an HDMI port, a USB port, etc.) or proprietary interfaces specified by a manufacturer of the local HMI display 320.

IED 300 may include various user interface inputs such as buttons 322 and 324. Buttons 322 may be configured by the manufacturer, and buttons 324 may be configurable by the end user. Buttons 322 and/or 324 may be used by an end user to communicate with and/or control IED 300.

IED 300 may further include a number of communications ports as described in more detail hereinabove. As with the local HMI display 320, the IED 300 may be pre-configured such that each of the communications ports facilitate communication in a particular human language. The particular language associated with each of the communications ports may be specified by an end user by such specification on, for example, a model option table at ordering time. The IED 300 may be later reconfigured by a user to associate languages with communications ports to facilitate communications in particular human languages using particular communications ports. Communications port 326 may be located on a front of IED 300 such that the IED 300 may be temporarily accessed by a device such as a laptop computer 306. IED 300 may include further communications ports that may be located on an access panel or a back side of the IED (not separately illustrated). One such communications port may be in communication with a device such as workstation 302, where another such communications port may be in communication with a device such as workstation 304 over a communications network 310. One or more devices (such as, for example, workstation 304) may be remote from IED 300.

As described above, IED 300 may be configured to facilitate communications in different human languages on each communications port. As illustrated, IED 300 is configured to communicate over port 326 with a user via laptop 306 in the Italian language. IED 300 is configured to communicate over another communications port with a user via workstation 302 in the Spanish language, and over yet another communications port with a user via workstation 304 in the Portuguese language. As detailed above, IED 300 may be capable of such communication simultaneously.

In one embodiment, IED 300 may be a protective relay in communication with an electric power delivery system in Europe. An electric power system engineer may prefer to interface with the IED 300 in the English language, and has thus configured the IED to display in the English language on the front panel display 320 and facilitate communications in the Italian language using the local communications port 326. IED 300 may be situated in a substation where the Spanish language is used on other devices and literature, thus IED 300 may be configured to facilitate communications in the Spanish language using a particular communications port that is in communication with a workstation 302 located in the same enclosure as the IED 300. Thus engineers, technicians, security, and information services personnel accustomed to interfacing with devices in the Spanish language may interface with IED 300 in the Spanish language using workstation 302. Furthermore, IED 300 may be in service protecting an electric power delivery system that is accessed by users who prefer to interface with devices in the Portuguese language.

IED 300 may be configured with one or more communications ports accessible over a communications network 310. In the illustrated embodiment, communications with workstation 304 in the Portuguese language may be transmitted over TCP port 2000, while communications with workstation 308 in the French language may be transmitted over TCP port 2001. Once the IED 300 has been configured to communicate in the predetermined languages using the predetermined communications ports and front panel display, no further configuration is needed to communicate with the IED 300 in those various languages over the assigned ports.

FIG. 3 illustrates an IED with a local HMI display 320 and separate communications ports. It should be noted that the IED 300 may be configured with any number of languages, and configurable to facilitate communications over any of the communications ports, including a network communication port, and/or the local HMI display 320 in any of the languages. In some embodiments, different human languages are facilitated on each of the communications ports and local HMI display. In other embodiments, two or more of the communications ports and/or local HMI display may facilitate communications in a common human language. Multiple combinations are envisioned.

FIG. 4 illustrates a conceptual representation of a system 400 for facilitating communications with an electric power system protective device in a plurality of human languages consistent with embodiments of the present disclosure. System 400 includes a workstation 402, a protective device 410, and a recloser 420. Recloser 420 may be configured to selectively connect or disconnect a plurality of conductors 422*a-c*. Recloser 420 may be in communication with protective device 410 via a monitored equipment interface 412. Workstation 402 may be in communication with protective device 410 via a communication interface 413. A single workstation 402 is illustrated in FIG. 4, however, in other embodiments, a plurality of workstations configured to use a plurality of human languages may be in communication with protective device 410.

In the illustrated embodiment, workstation 402 may be configured to communicate with protective device 410 in Spanish using a text-based command interface 404 of workstation 402. Using the text-based command interface 404 a user may enter a query command (i.e., "estado") to determine the status of recloser 420. Arrow 406 indicates that the query command is passed to communication interface 413 of protective device 410. In some embodiments, communication interface 413 may be configured to communicate exclusively in Spanish. Upon receipt of the query command, protective device 410 may utilize an array including a plurality of functions accessible using a plurality of languages to determine an appropriate action and response. The command received from workstation 402 (i.e., "estado") may be located in the appropriate human language column of array 414, and the appropriate action associated with the command may be implemented. In the illustrated embodiment, the status of recloser 420 may be interrogated via monitored equipment interface 412, as indicated by arrow 416. The status may be returned, as indicated by arrow 418. Based on the returned status, an appropriate response may be determined. In the illustrated embodiment, the conductors 422*a-c* are disconnected. Accordingly, the appropriate response indicated by arrow 414 is "desconectado." This response may be communicated via communication interface 413 to workstation 402, as indicated by arrow 408, and displayed to the user on the text-based command interface 404.

Although the various embodiments herein are detailed in terms of a multilingual IED, it is appreciated that various intelligent devices may use the inventive concepts described herein. For example, communications processor, automation controllers, programmable logic controllers, and the like may similarly be configured to facilitate communications in different human languages using different communications ports.

It will be understood by those having skill in the art that many changes may be made to the details of the above-described embodiments without departing from the underlying principles of the disclosure. For example, any suitable combination of various embodiments disclosed herein, or the features, elements, or components thereof, is contemplated, irrespective of whether such features, elements, or components are explicitly disclosed as being part of a single exemplary embodiment.

Throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, inventive aspects lie in a combination of fewer than all features of any single foregoing disclosed embodiment.

A variety of modifications in and to the embodiments and implementations disclosed herein will be apparent to those persons skilled in the art. Accordingly, no limitation on the invention is intended by way of the foregoing description and accompanying drawings, except as set forth in the appended claims.

The invention claimed is:

1. A system for facilitating communications with an electric power system protective device in multiple human languages, comprising;
   a first human-machine interface device configured to receive a first input in a first human language and to receive a first response in the first human language;
   a second human-machine interface device configured to receive a second input in a second human language and to receive a second response in the second human language; and,
   an electric power system device configured to execute a first command associated with the first input and to execute a second command associated with the second input, the electric power system device comprising:
      a first communications port in communication with the first human-machine interface device;
      a second communications port in communication with the second human-machine interface device;
      a monitored equipment interface configured to communicate the first command and the second command to a component of an electric power system; and
      a processor in communication with the first communications port and the second communications port and configured to:
         generate a first response in the first human language based on the human language of the first input, and
         generate a second response in the second human language based on the human language of the second input;
      wherein the first response and the second response are based on an array of values stored in a memory device in communication with the processor, the array comprising a first association between the input in the first human language, the first command, and the first response in the first human language and a second association between the second input in the second human language, the second command, and the second response in the second human language; and wherein the first response is communicated through the first communication port and displayed on the first human-machine interface device, the first communication port being configured to subsequently communicate in the first human language, and the second response is communicated through the second communication port and displayed on the second human-machine interface device, the second communication port being configured to subsequently communicate in the second human language.

2. The system of claim 1, wherein the first communication port is configured to communicate exclusively in the first human language, and the second communications port is configured to communicate exclusively in the second human language.

3. The system of claim 1, wherein the array further comprises a plurality of functions accessible by the first human language and by the second human language.

4. The system of claim 3, wherein the array comprises a plurality of input text strings in a plurality of human languages, including the first human language and the second human language, and a plurality of functions associated with the plurality of input text strings to be implemented by the component of the electric power system.

5. The system of claim 3, wherein the array further comprises a plurality of response text strings in the plurality of human languages, including the first human language and the second human language, and wherein the first response and the second response are associated respectively with the first input and the second input in the array.

6. The system of claim 1, wherein the electric power system protective device further comprises a network communications port configured to receive communications using a plurality of logical ports, and wherein the first communications port and the second communications port each comprise a logical port associated with the network communications port.

7. The system of claim 1, wherein the first input, the first response, the second input, and the second response each comprise a text string.

8. The system of claim 1, wherein the first human language and the second human language comprise different human languages.

9. The system of claim 1, further comprising:
a display subsystem configured to:
display the first response in the first human language on the first human-machine interface; and
display the second response in the second human language on the second human-machine interface.

10. The system of claim 1, wherein the first human-machine interface device and the second human-machine interface device comprise a text-based command interface.

11. The system of claim 1, wherein the electric power system device comprises a local display configured to facilitate communications in a third human language.

12. The system of claim 11, wherein each of the first human language, the second human language, and the third human language comprise different human languages.

13. The system of claim 1, wherein the electric power system device comprises one of an intelligent electronic device and a programmable logic controller.

14. The system of claim 1, wherein the electric power system device is configured to facilitate communications in the first human language and the second human language simultaneously.

15. The system of claim 1, wherein the first communications port comprises a front-panel communications port.

16. The system of claim 1, wherein the electric power system device comprises a local human-machine interface display in communication with one of the first communications port and the second communications port.

17. An intelligent electronic device ("IED") for facilitating communications in a plurality of human languages, comprising:
a first communications port in communication with a first human-machine interface device and configured to receive a first input in a first human language;
a second communications port in communication with the second human-machine interface device and configured to receive a second input in a second human language;
a monitored equipment interface configured to communicate the first command and the second command to a component of an electric power system; and
a processor in communication with the first communications port and the second communications port and configured to:
generate a first response in the first human language based on the human language of the first input,
generate a second response in the second human language based on the human language of the second input,
communicate the first response to the first communications port, and
communicate the second response to the second communications port;
wherein the first response and the second response are based on an array of values stored in a memory device in communication with the processor, the array comprising the command, an association between the command and the first input in the first human language and the second input in the second human language; and an association between the command and the first response in the first human language and the second response in the second human language;
wherein the first response is communicated through the first communication port and displayed on the first human-machine interface device, the first communication port being configured to subsequently communicate in the first human language, and the second response is communicated through the second communication port and displayed on the second human-machine interface device, the second communication port being configured to subsequently communicate in the second human language.

18. The IED of claim 17, wherein the IED is configured to facilitate communications in particular human languages over the first communications port and the second communications port by a manufacturer of the IED according to specifications of an end user of the IED.

19. The IED of claim 17, wherein the IED is configurable by the end user to facilitate communications in different human languages over the first communications port and the second communications port.

20. An electric power system protective device for facilitating communications in a plurality of human languages, comprising;

a plurality of human-machine interface devices configure to communicate through a plurality of communication ports;

a first human-machine interface device among the plurality of human-machine interface devices configured to receive an input in one of a plurality of human languages;

a first communications port among the plurality of communication ports in communication with the first human-machine interface device;

a processor in communication with the plurality of communications ports configured to:
 receive the input;
 identify the one of a plurality of human languages based on the input; and
 associate the input with a command based on an array of values;

a monitored equipment interface configured to communicate the command to a component of an electric power system;

the processor further configured to:
 generate a response in the identified human language based on a status of the component of the electric power system;

wherein the array of values stored in a memory device in communication with the processor, the array comprising an association between the input in one of the plurality of human languages, the command, and the response; and wherein the response is communicated through the first communication port and displayed on the first human-machine interface device, the first communication port being configured to subsequently communicate in the identified human language.

* * * * *